United States Patent Office 3,492,908
Patented Feb. 3, 1970

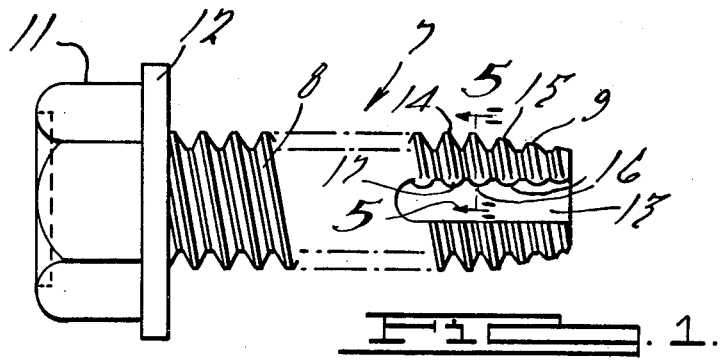
FIG. 1.
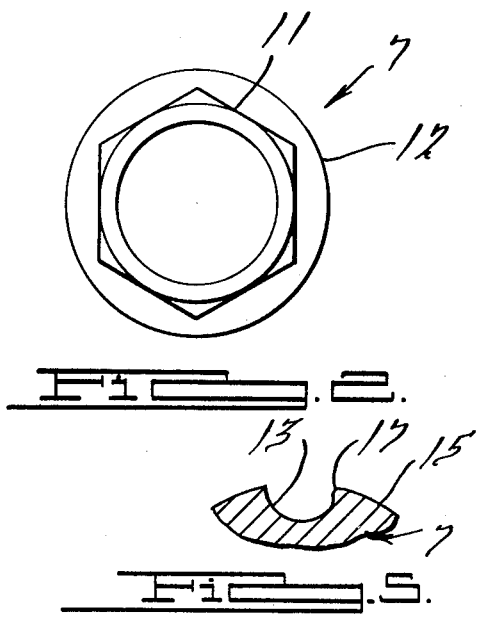
FIG. 2.
FIG. 5.
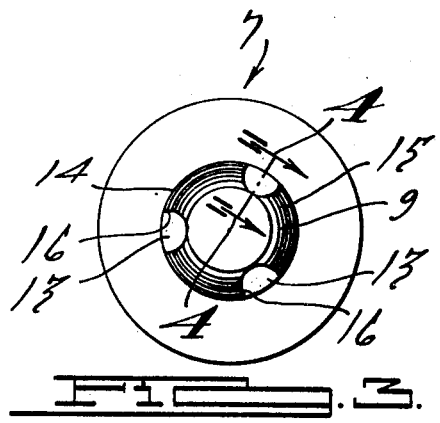
FIG. 3.
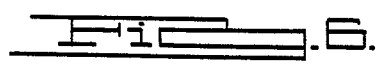
FIG. 6.
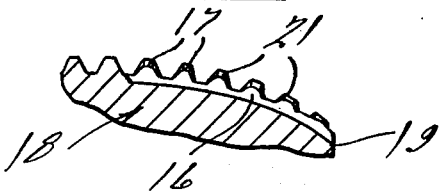
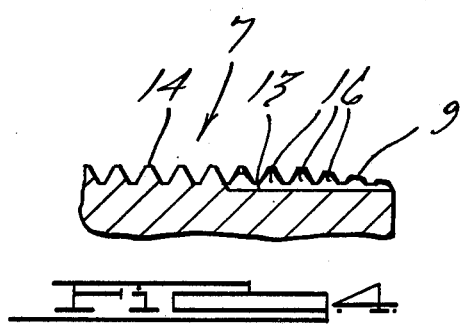
FIG. 4.
INVENTOR.
Raymond L. Thurston
BY
Harness, Dickey-Pierce
ATTORNEYS

---

3,492,908
THREAD SWAGING SCREW OR BOLT
Raymond L. Thurston, Dearborn, Mich., assignor to Microdot Inc., New York, N.Y., a corporation of California
Filed Jan. 17, 1969, Ser. No. 792,072
Int. Cl. B21h 3/04; B23g 7/02; F16b 25/00, 33/02
U.S. Cl. 85—47   6 Claims

ABSTRACT OF THE DISCLOSURE

The screw or bolt is formed to have a threaded body with a driving head on one end and a chamfered thread on a tapered section at the other end into which at least three flutes are provided extending from the end into the thread of the body. The thread is rolled on the body after the flutes are provided therein so that the leading edge of the thread sections will flow into the flutes and form swaging ends which will prevent a cutting operation in the hole in which the screw or bolt is driven.

---

COPENDING APPLICATIONS OF INTEREST

Two associated applications by the inventor, one for a Lock Nut, Ser. No. 748,859, filed July 30, 1968; another for a Drill Screw With Swaging Threads, Ser. No. 793,259, filed Jan. 23, 1969, both of which have been assigned to the assignee of the present invention appear of interest.

BACKGROUND OF THE INVENTION

Reference may be had to Patents 1,963,542; 2,136,458 and Re. Patent 20,580 for prior art which were the closest uncovered in a search.

SUMMARY OF THE INVENTION

The invention pertains to a screw or bolt which has a body swaged to provide a section of major diameter having a head on one end and a tapered section on the opposite end. Flutes are formed in the tapered end and the adjacent portion of major diameter. A thread is rolled into the body and in the tapered section in which the thread is chamfered. The rolling operation causes the material at the leading edge of the interrupted thread to flow into the flutes which prevents cutting and to produce a swaging operation on the wall of the hole into which the screw is driven. Three or more of the flutes are employed so as to have three or more sections which provide stability when the screw is being driven. The swaging of the threads in the wall of the aperture produces a substantial force thereat which produces a binding action on the threads of the body to hold the screw in driven position. The screw is made from the same metal and heat treated in the same manner as standard screws which can be made in different grades as provided by SAE standards. The bolt or screw is simple to manufacture, is stabilized by the plurality of entrance sections, requires a minimum force to start the screw into the aperture and the resulting swaging operation of the thread maintains a clean hole and produces stress in the material of the hole and a binding force on the thread on the major diameter of the body.

BRIEF DESCRIPTION OF THE DRAWING

FIGURE 1 is a view in elevation of a screw or bolt embodying features of the present invention;

FIG. 2 is a view of the structure illustrated in FIG. 1, as viewed from the left-hand end thereof;

FIG. 3 is a view of the structure illustrated in FIG. 1 as viewed from the right-hand end thereof;

FIG. 4 is a broken sectional view of the structure illustrated in FIG. 3, taken on the line 4—4 thereof;

FIG. 5 is an enlarged broken sectional view of the sctructure of FIG. 1, taken on the line 5—5 thereof, and FIG. 6 is a view of structure, similar to that illustrated in FIG. 4, showing another form of the invention.

DESCRIPTION OF THE PREFERRED EMBODIMENT

The screw or bolt 7 has a body 8 of major diameter and a forward section 9 which tapers to a minor diameter. The body 8 has a driving head 11 which may take different forms and is herein illustrated as being of hexagon shape with a cylindrical flange 12 thereon providing a washer-engaging face. The body 8, the tapered section 9 and the driving head 11 are formed by swaging a section of a rod or wire in the conventional manner. Thereafter, three or more semi-cylindrical flutes 13 are swaged, milled or otherwise formed in the forward section 9 and in the adjacent portion of the body 8. Thereafter, a thread 14 is rolled between a pair of threading dies to form the thread on the body 8 and the chamfered thread 15 on the forward section 9. During the rolling operation the interrupted thread in the forward section has the advancing edges of the thread sections moved into the faces of the flutes. Rounded points 17 of the advancing ends of the thread sections, as illustrated in FIGS. 1 and 5, perform a swaging rather than a cutting operation when driven into the wall of a hole. This keeps the hole clean of any cuttings and at the same time produces a thread in the hole wall which will exert substantial pressure on the threads 14 on the body after the driving operation.

The screw or bolt is made from the same material and heat treated in the same manner as standard screws which are made in different grades as set by SAE standards. As noted in FIGS. 1 and 3, each section of the thread 15 has its forward face 16 rolled into the flutes to form the rounded swaging points 17 rather than cutting faces. The forward end of the chamfered thread initially engages the wall of the hole and progressively deflects the metal thereof which is progressively swaged as the screw or bolt advances into the hole. This forces the metal of the wall outwardly of the hole center and eventually forms it into a thread which will be engaged by the thread 14 on the major axis 8 of the body. The squeezing force in the thread in the hole wall causes a binding engagement with the thread 14 on the body 8 and will lock the screw or bolt within the hole after the driving operation.

In FIG. 6, a further form of the invention is illustrated, that wherein a forward section 18 is rounded to further reduce the diameter of the entrance end 19. This provides a gimlet point which reduces the thread forming torque by allowing the full thread depth of a minor diameter to lead the way for the finished threaded form. The screw or bolt is formed in the manner pointed out above with the exception of employing thread forming dies having an arcuate end which forms chamfered thread sections 21 on the rounded end of the forward section 18.

What is claimed is:

1. In a screw or bolt, a body having a major diameter with a driving head on one end and a section at the opposite forward end reduced to a diameter less than that of said major diameter, the forward reduced section and the adjacent part of the body having a plurality of flutes provided therein located substantially equidistant apart, and a continuous thread of the same root diameter provided on the body and the reduced end, the latter being formed into arcuate sections by the flutes, the leading end of each of said arcuate sections extending into said flutes with the extremities of the thread ends therealong being convexly rounded to provide swaging ends thereon.

2. In a screw or bolt as recited in claim 1, wherein the thread on the reduced section is at least three pitch in length having a runout at the forward end which initiates the swaging operation when the screw or bolt is driven into a hole.

3. In a screw or bolt as recited in claim 2, wherein the forward section is tapered to the end which is of a diameter substantially equal to the major diameter of the thread on the body less twice the depth of the thread.

4. In a screw or bolt as recited in claim 3, wherein the arcuate sections are semicylindrical in form, are disposed in parallel relation to each other and the axis of the body and extend radially inwardly at least to the root of said thread.

5. In a screw or bolt as recited in claim 4, wherein three flutes are provided forming three thread sections at the forward end which extend into the body thread and provide stability during the driving operation.

6. In a screw or bolt as recited in claim 1, wherein the forward reduced section is rounded along the axial length with the thread sections thereon following the rounded form thereof.

References Cited

UNITED STATES PATENTS

| 2,165,010 | 7/1939 | Rosenberg | 85—47 |
| 3,209,383 | 10/1965 | Carlson | 10—152 |
| 3,251,080 | 5/1966 | Sharon | 10—152 |

RAMON S. BRITTS, Primary Examiner

U.S. Cl. X.R.

10—10, 152